United States Patent [19]
Lajtai et al.

[11] Patent Number: 5,168,556
[45] Date of Patent: Dec. 1, 1992

[54] METHOD AND CIRCUIT ARRANGEMENT FOR CONTROLLING A SERIAL INTERFACE CIRCUIT

[75] Inventors: Karoly Lajtai, Budapest, Hungary; Josef Fenzl, Munich, Fed. Rep. of Germany

[73] Assignee: Siemens Aktiengesellschaft, Munich, Fed. Rep. of Germany

[21] Appl. No.: 413,228

[22] Filed: Sep. 27, 1989

[30] Foreign Application Priority Data

Sep. 30, 1988 [EP] European Pat. Off. ............ 88116233

[51] Int. Cl.⁵ .............................................. G06F 13/00
[52] U.S. Cl. .............................. 395/325; 364/DIG. 2; 364/927.98; 364/939.5
[58] Field of Search ................ 395/325, 200; 307/475, 307/480; 364/DIG. 1, DIG. 2

[56] References Cited

U.S. PATENT DOCUMENTS 4,263,670   4/1981   Sherman .................... 364/DIG. 2
4,691,297   9/1987   Wolff ........................ 364/900

FOREIGN PATENT DOCUMENTS 0164105  12/1985  European Pat. Off. .

OTHER PUBLICATIONS

IBM Technical Disclosure Bulletin, vol. 28, No. 6, Nov. 1985, pp. 2574-2575.
IBM Technical Disclosure Bulletin, vol. 30, No. 6, Nov. 1987, pp. 54-56.
IEEE International Conference, ICCC 82, Sep. 28-Oct. 1, 1982, pp. 98-100.
Elektronik, vol. 36, No. 4, Feb. 20, 1987, pp. 77-80.

Primary Examiner—Thomas M. Heckler
Attorney, Agent, or Firm—Hill, Van Santen, Steadman & Simpson

[57] ABSTRACT

A method and circuit for reducing the load of the microprocessor unit of a microprocessor controlled, serial interface circuit. The transmission side of the interface circuit has a first auxiliary stage that, dependent on the presetting by the microprocessor unit generates a control bit stream and transmits a data bit stream from a serial bit stream converter stage. A self-generated data bit stream generates prompter signals for the microprocessor unit and the reception side of the interface circuit has a second auxiliary stage that recognizes message changes over a predetermined time period and generates a prompter signal when the message change occurs.

16 Claims, 3 Drawing Sheets

METHOD AND CIRCUIT ARRANGEMENT FOR CONTROLLING A SERIAL INTERFACE CIRCUIT

BACKGROUND OF THE INVENTION

1. Field of the Invention

The invention relates to a method and to a circuit arrangement for controlling the serial bit streams through a microprocessor-controlled, serial interface circuit.

2. Description of the Prior Art

The performance capability of a microprocessor unit contained in a microprocessor-controlled, serial interface circuit arrangement is limited to a greater or lesser degree by numerous control jobs. For a data transmission, for example, a receiver must be synchronized so that a defined bit pattern is continuously supplied to it. Considerable outlay is needed for this function alone. Another example is monitoring messages that are received at the interface circuit arrangement. The messages must be checked repeatedly for changes and a determination must be made whether a new reaction by the microprocessor unit has become necessary. The microprocessor unit is not available for more difficult jobs, such as handling protocols of higher ISO levels during such monitoring jobs. Overload of the microprocessor unit and, as a result, loss of time can occur merely on the basis of the control and monitoring jobs high line speeds. Time losses also occur when the microprocessor unit can only conditionally consider different time conditions as a consequence of different data transmission rates. These losses occur because the microprocessor unit has no chronological information indicating when the transmission of a serial bit stream has ended. A bit stream can be transmitted with different BAUD rates. A succeeding bit stream can only be transmitted when the preceding bit stream has been transmitted. So that no time problems arise, the microprocessor unit usually assumes that a bit stream was transmitted with the slowest BAUD rate.

SUMMARY OF THE INVENTION

A first object of the invention is to provide an improved method for reducing the load on a microprocessor unit of a microprocessor-controlled serial interface circuit arrangement.

A second object of the invention is to provide an improved circuit for reducing the load on a microprocessor unit of a microprocessor-controlled serial interface circuit arrangement.

The first object is achieved in a method executed in accordance with the principles of the present invention, wherein a relieving effect for the microprocessor unit is achieved when a part of the job previously accomplished by the microprocessor unit is executed by specialized auxiliary units that are only initialized by the microprocessor unit. The microprocessor unit thus gains time to handle its critical jobs. Since the output of the auxiliary units are dependent on the actual transmission rates, time losses caused by delay time spans in the data transmission are avoided.

The second object is achieved in a circuit arrangement for the implementation of the method constructed in accordance with the principles of the present invention, wherein the transmission or reception clock counter units of the auxiliary units utilize the transmission and reception clocks that are co-transmitted on the interface lines to obtain true chronological information about when a bit stream was actually transmitted. The counter units of the auxiliary units are formed of programmable counters to adapt the circuit arrangement of the present invention to different work conditions.

DETAILED DESCRIPTION OF THE PREFERRED EMBODIMENTS

Figure 1:
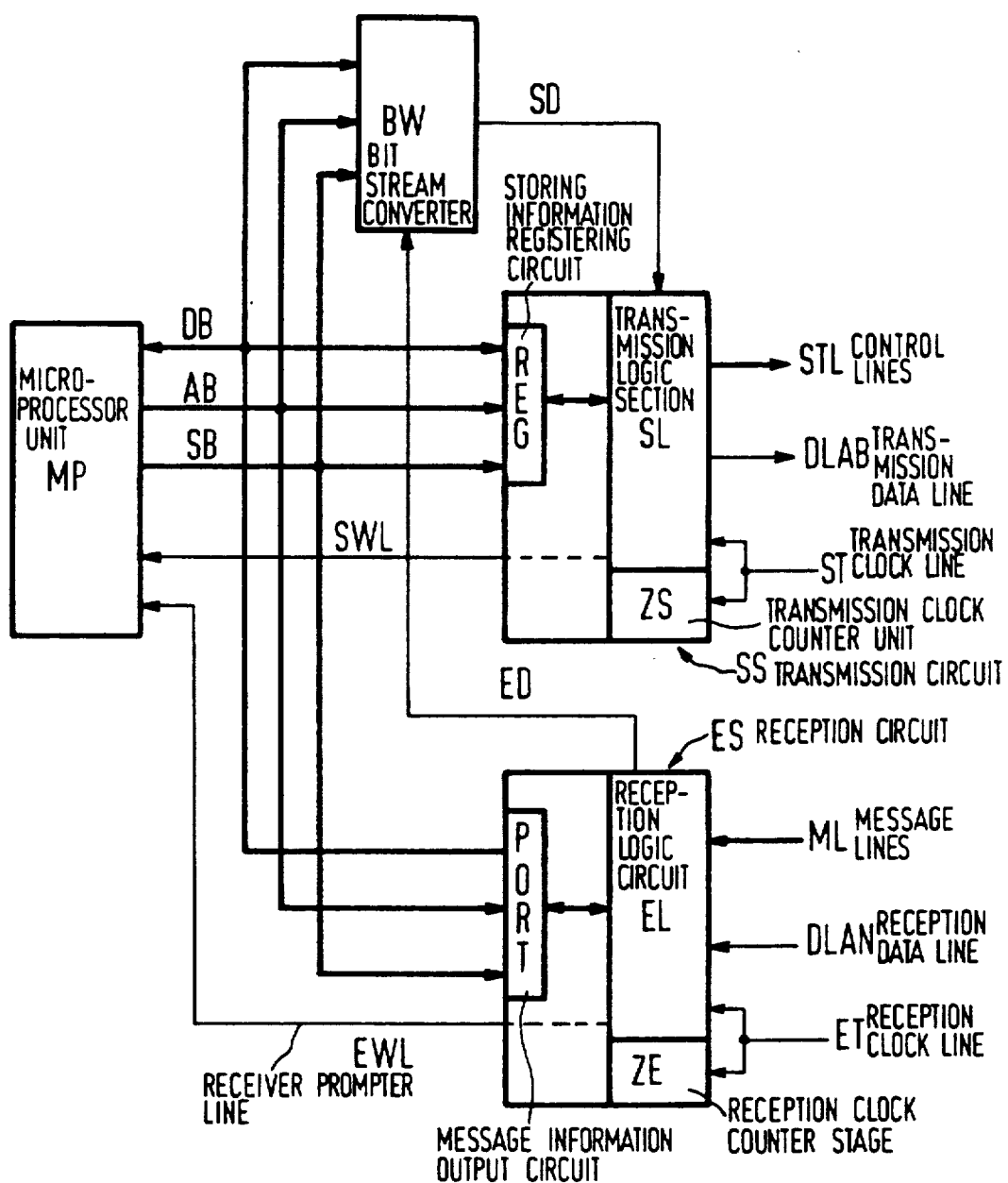
FIG. 1 is a general block diagram of a serial interface circuit constructed according to the principles of the present invention.

The circuit arrangement shown in FIG. 1 includes a microprocessor unit MP, a bit stream converter BW, a transmission circuit SS, and a reception circuit ES. These components are connected to one another via a data, address and control bus DB, AB and SB, respectively. There is also a connection between the bit stream converter BW and the transmission circuit SS via line path SD and through the reception circuit ES via line path ED. The serial data bit streams to be transmitted are forwarded to the transmission circuit SS via line path SD. The serial data bit streams received by the reception circuit ES are forwarded to the bit stream converter BW via a line path ED. There is a connection between the transmission circuit SS and the microprocessor unit MP via a transmitter prompter line SWL and a connection between the reception circuit ES and the microprocessor unit MP via a receiver prompter line EWL. Via the transmitter prompter line SWL and the receiver prompter line EWL, the microprocessor unit MP can be supplied with information from the transmission circuit SS and the reception circuit ES. This information indicates the actual end of an output bit stream or the presence of a new message.

The transmission circuit SS includes a sub-circuit REG for storing and registering information, a transmission logic section SL, and a transmission clock counter unit ZS. Sub-circuit REG is connected to the buses and receives signals transmitted thereto intended for the transmission circuit. The transmission circuit SS can be set by the microprocessor unit MP via the sub-circuit REG and can then be left to operate on its own. According to this structure, the transmission logic SL outputs a bit stream serially converted by the bit stream converter BW for outputs of self-generated bit streams. Dependent on the structure of the transmitter circuit, the self-generated bit streams can have different values. For example, there may be a continuous bit stream of ones, a continuous bit stream of zeros, or an alternating zero and one bit stream as output. The microprocessor unit is, as a result, relieved of controlling the output of such bit streams.

When sending data streams, the microprocessor unit MP is provided with time signals via the transmitter prompter line SWL. The microprocessor unit MP recognizes, on the basis of these time signals, when a data bit stream is being supplied. The time signals generated are dependent on the actual transmission rate that is defined by the transmission clocks. As a result, the microprocessor unit MP need not take any clearance time into consideration when it initiates the output of a succeeding bit stream.

A transmitter prompter signal is supplied via the transmitter prompter line SWL which is controlled by a transmission clock counter unit ZS. Unit ZS is supplied with the transmission clocks via the transmission clock line ST. The transmission clock counter unit ZS, for example, is formed by a presettable counter that generates an overflow signal when the preset maximum counter reading is reached. The presetting of the maximum counter reading can be conducted by the microprocessor unit MP.

The transmission logic SL has two outputs, one for a control bit stream, and one for a data bit stream to be transmitted. A first bit stream is transmitted via the line path STL and the second bit stream is transmitted via the line path DLAB.

The reception circuit ES is the counterpart to the transmission circuit SS. The reception circuit ES monitors changes in arriving signals, when a change occurs it transmits a signal to the microprocessor unit MP via the receiver prompter line EWL. The microprocessor unit MP becomes active only when a change of the message contents occurs. After receiving information that a change of the message has occurred, the microprocessor unit MP retrieves the new message information from the reception circuit ES. The microprocessor unit MP is free to check the message lines for status changes.

The reception circuit ES includes a message information output circuit PORT, a reception logic EL and a reception clock counter unit ZE. The buses, as described above, are connected to the message information output circuit PORT. In the direction of the microprocessor unit MP, these specific signals are essentially new messages as control signals in the direction toward the reception circuit. The addresses are served for selecting the reception circuit ES. Before being forwarded to the microprocessor unit MP, the serially received data are supplied via the line path ED to the bit stream converter BW to be converted the serial data stream back into a parallel data stream.

The reception logic EL has inputs for the message lines ML and for the reception data line DLAN. A message bit stream is transmitted via the message lines ML and a serial data bit stream is transmitted via the reception data line DLAN. The reception logic EL has a reception clock counter stage ZE, both are supplied with the reception clock via the reception clock line ET. The reception clock counter stage ZE determines how long a message change has already been present on the basis of the reception clock. A communication in the form of a prompter signal to the microprocessor unit MP occurs only when the new message has lasted for a predetermined time span. The length of the time span can be set with a fixed or optional allocation of a value at a programmable counter contained in the counter unit. This programmable counter counts from the point in time of the change of the message until an overflow signal arises according to the preset value.

The circuit arrangement of FIG. 1 is a fundamental illustration of a serial interface circuit of the invention and can be designed as a circuit for various types of serial interfaces. The design of the circuit arrangement as a V24 or X21 interface circuit shall be considered in greater detail below. In the design for a V24 interface circuit, the control lines STL can, for example, designate the control lines reference S1 (108), S2 (105), PS2 (140) and PS3 (141) according to the German standard (not shown) and the transmission data line DLAB can designate the data line reference D1 (103) according to the German standard (not shown). The parenthetical numbers represent the corresponding numbers of the lines according to the CCITT standard. The message lines ML supplied into the reception logic can designate the reception lines reference M1 (107), M2 (106), M3 (125) and M5 (109) according to the German standard and the reception data line DLAN can designate the data line reference D2 (104) according to the German standard (not shown). In the realization of the circuit arrangement as X21 interface circuit, the control lines STL can designate the control line reference C according to the German and CCITT standards and the transmission data line DLAB can designate the data line reference T according to the German and CCITT standards (not shown). The message lines ML can designate the message line reference I according to the German and CCITT standards and the reception data line DLAN can designate the data line reference R (not shown).

Since the messages are concurrently transmitted in parallel over a time period, i.e., quasi-stationary, a monitoring for changes of the message in a V24 interface circuit ensues so a receiver prompter signal is supplied into the microprocessor unit MP when the signal status on at least one of the message lines ML has changed for a certain time span. In the X21 interface circuit arrangement, in contrast, messages are serially forwarded by a message line I (not shown in FIG. 1), via the reception data line R (likewise not shown in FIG. 1). Therefore, successor statuses must be monitored over a predetermined time period.

Figure 2:
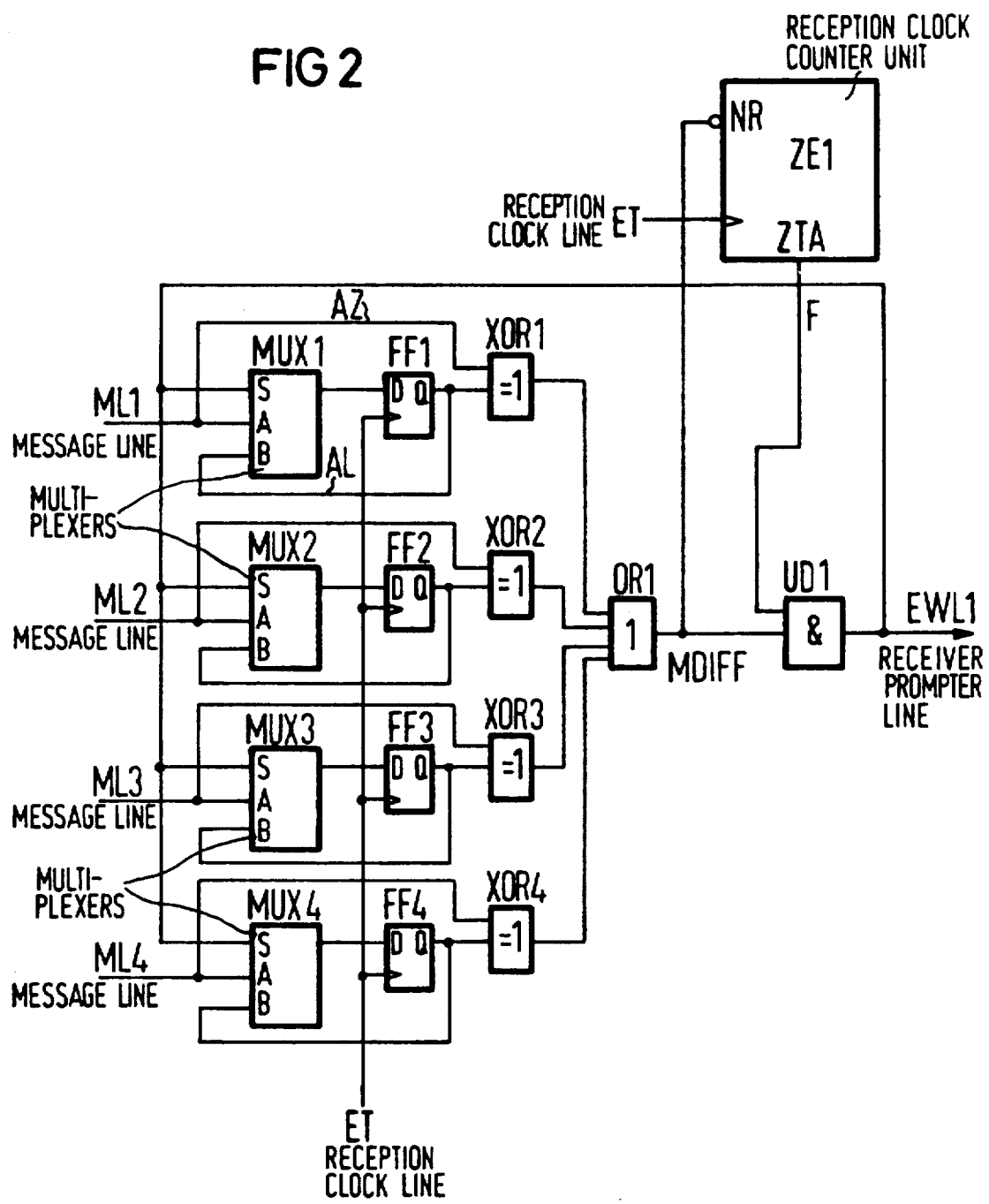
FIG. 2 is a schematic circuit diagram of the reception logic sub-circuit in FIG. 1.

FIG. 2 shows a preferred embodiment of a monitoring circuit for message lines ML1 through ML4 of the V24 interface circuit arrangement. Each of the message lines ML1 through ML4 is connected to an input of one of the multi-clock memory units that are each formed of one of the selection switches MUX1 through MUX4 that are followed by memory units FF1 through FF4, respectively. Exclusive-OR elements XOR1 through XOR4 follow memory units FF1 through FF4, respectively. The multi-clock memory units are linked via an OR element OR1 to generate one overall signal. The overall signal is supplied, via the OR signal line MDIFF, to a first input of the output AND element UD1. The enable signal, via enable signal line F, is supplied to a second input of the output AND element UD1. The output of output AND element UD1 is designated as reception prompter signal EWL1. The enable signal, conducted via the enable line F, is generated by the reception clock counter unit ZE1 and is supplied from the timing clock output ZTA. The reception clock counter unit ZE1 is a counter that, after it is enabled, counts in synchronization with the reception clocks transmitted by the reception clock line ET and generates an overflow signal when its maximum counter reading is exceeded.

The monitoring circuit shall be set forth in greater detail with reference to the message line ML1 and to the multi-clock memory unit allocated to the message line ML1. The selection switch MUX1 receives a current, valid signal from message line ML1 and a stored valid signal status via the feedback line AZ. As long as no status change ensues on the message line ML1, the stored, valid signal status is forwarded, via selection switch line AL, to the D-flip-flop FF1 which accepts the stored, valid signal status repeatedly with every reception clock signal via reception clock line ET. At this point in time, the inputs of the exclusive-OR element XOR1 exhibit the same signal level. The output signal of the exclusive-OR element XOR1, that exhibits the logic value of zero, is supplied to the negating reset input of the reception clock counter unit ZE1 and the first input of the output AND element UD1 via the OR element OR1 and overall signal output line MDIFF. The enable signal generated by the reception clock counter unit ZE1 is supplied to, via the enable signal line F, the second input of the output AND element UD1. Since the logic signal level of the overall signal output line MDIFF has the value zero, the initiation of the reception clock counter unit ZE1 is prevented and the output AND element UD1 is not operative. As a result, no signal is received via receiver prompter line EWL1.

When the signal status on the message line ML changes, the signal levels of the exclusive-OR element XOR1 first exhibit different values, so that the signal on the overall signal output line MDIFF assumes the logic value of one. The reception clock counter unit ZE1 and the output AND element UD1 are now enabled. The enable signal F, that is received via the receiver prompter line EWL1, is generated when the maximum counter reading of the reception clock counter unit ZE1 is exceeded. The selection switch MUX1 is switched by this signal, so that the new signal level is supplied to the D-flip-flop FF1 via the message line ML1. The new signal level is assumed by the D-flip-flop FF1 at the next reception clock signal. The inputs of the exclusive-OR element XOR1 now have the same signal level to cause the reception clock counter unit ZE1 to reset again. The signal on the output line EWL1 is in turn disconnected via the output AND element UD1. Parallel thereto, the selection switch MUX1 is again switched, so that it now supplies the newly stored signal status that coincides with the signal status currently supplied via the message line ML1 until its next change in signal status.

Figure 3:
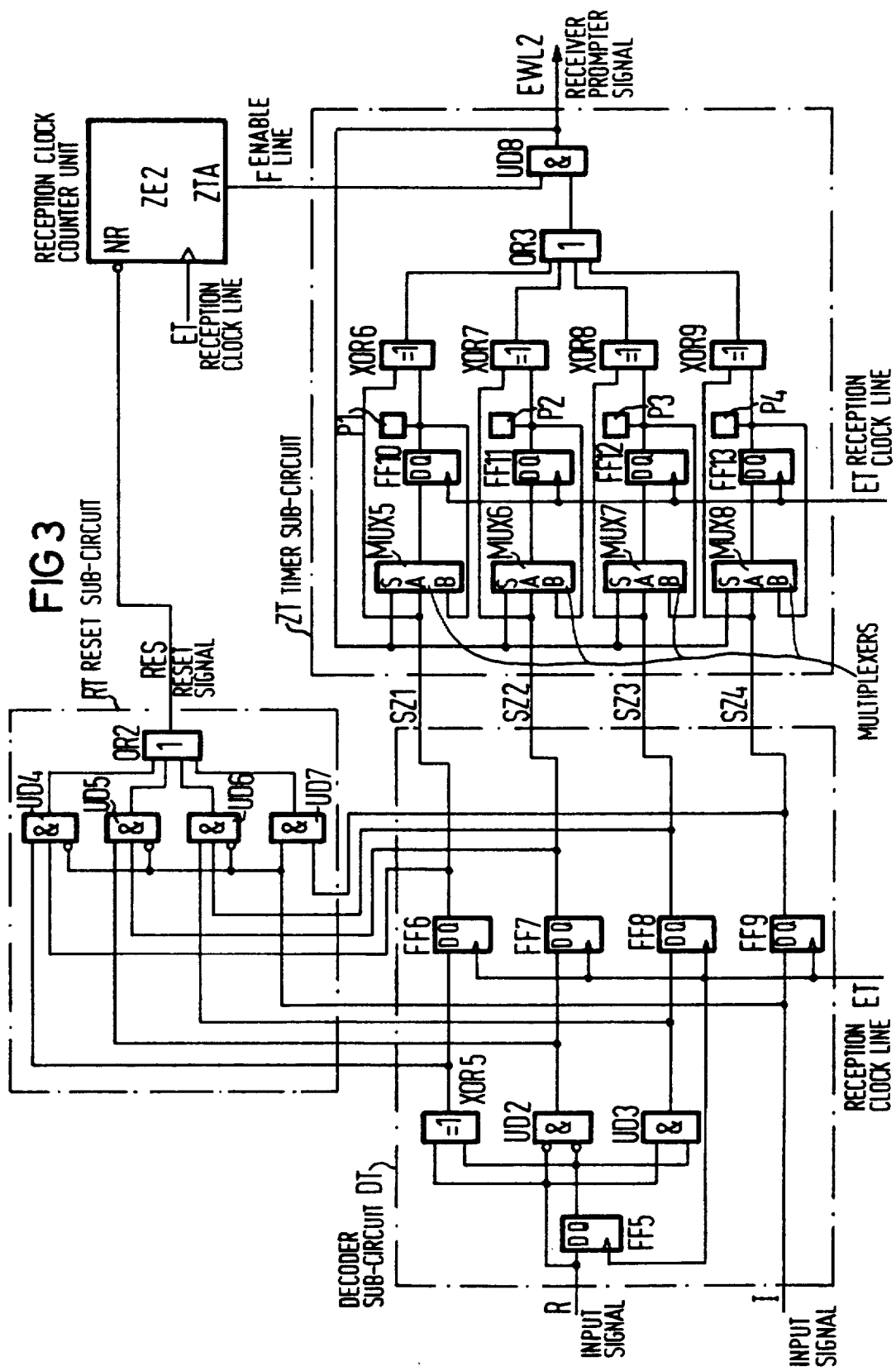
FIG. 3 is another embodiment of the reception logic sub-circuit in FIG. 1.

FIG. 3 shows the circuit designed as an X21 circuit arrangement for the reception circuit ES responsible for generating a receiver prompter signal EWL after the change of message which arrives at the reception logic EL. The circuit monitors the signals on the X21 interface lines I and R. These signals shall also be referred to in brief below as I and R signals. In a similar way, the receiver prompter signal transmitted via the line path EWL1 shall be referred to below as receiver prompter signal EWL2. Likewise, internal signals of the circuit shall be referred to in brief by the name of the line paths by which they are transmitted.

Four signal statuses SZ1 through SZ4 of the I and R signals are monitored so a change from one signal status to another leads to the receiver prompter signal EWL2 when the change lasts a prescribed number of reception clocks ET transmitted on a given signal line. The four signal statuses each correspond to different messages and are as follows:

SZ1: I = 0
R = 0101 alternating
SZ2: I = 0
R = 0000 ...
SZ3: I = 0
R = 1111 ...
SZ4: I = 1
R = X; X = arbitrary The overall circuit can be interpreted as being divided into a number of circuit sections that are referred to below as decoder sub-circuit DT, reset sub-circuit RT, timer sub-circuit ZT and reception clock counter unit ZE2. The decoder sub-circuit DT, the timer sub-circuit ZT, and the reception clock counter unit ZE2 are controlled with the reception clock ET.

The reception clock counter unit ZE2 includes a negating reset input NR as well as a time clock output ZTA to which the enable line F is connected. Given the condition that the reception clock counter unit ZE2 has not been previously reset by the reset signal adjacent to the negating reset input, the enable signal, which is generated by the reception clock counter unit ZE2 when the prescribed maximum counter reading is exceeded, will be transmitted via the enable line F. The reception clock counter unit ZE2 is reset when the reset signal RES has the logic value of zero. On the basis of a special design of the overall circuit, the reset signal RES can only have the logic value zero for the length of one signal of reception clock ET. The enable signal F is supplied as receiver prompter signal EWL2 via the output AND element UD8 of the timer sub-circuit ZT when the additional input of the output AND element UD8 has the logic value of one. The additional input is selected with the logic value of one only when a message change has occurred and the reception clock counter unit ZE2 has not yet counted beyond its predetermined maximum counter reading. Therefore, only message changes that last longer than the prescribed number of reception clocks ET lead to a prompter unit to the microprocessor unit MP. Brief duration disturbances are not considered here.

The decoder sub-circuit DT recognizes the different messages on the basis of two chronologically successive clock points in time at which it respectively compares the input signals I and R to themselves. The input signal I dominates over the input signal R, the input signal R only takes effect when the input signal I has the logic value of zero. In this case, the AND elements UD4 through UD6 in the reset sub-circuit RT are enabled with respect to the other inputs. The AND element UD7 is simultaneously held inoperative.

When, under the assumption that nothing has changed for at least one counting cycle of the reception clock counter unit ZE2, the input signal I changes from the logical signal level zero to the logical signal level 1, the AND elements UD4 through UD6 are held inactive while the AND element UD7 is enabled. Since the logical level at the positive Q of the D-flip-flop FF9 is still zero at this point in time, the output of the AND element UD7 has the logic value of zero. A reset signal RES is supplied from OR element OR2, this reset signal RES has the logical value of zero. The reception clock counter unit ZE2 is reset by this signal.

At the next cycle of reception clock ET, the I signal is accepted by the D-flip-flop FF9 and is forwarded to the AND element UD7 and the exclusive-OR element XOR9. The output of the AND element UD7 assumes the logical value of one, as a result, the reception clock counter unit ZE2 is enabled. The output of the exclusive OR element XOR9 in the timer sub-circuit ZT likewise assumes the logical value of one and enables the output AND element UD8 via the OR element OR3 and enable signal F.

Since nothing except the signal I has changed for at least one counting cycle of the reception clock counter unit ZE2, the respective first inputs of the exclusive-or elements XOR6 through XOR8 connected to the positive outputs Q of the D-flip-flops FF10 through FF12 have the same logic values as the respective second inputs that are connected to the outputs of the D-flip-flops FF6 through FF8 of the decoder sub-circuit DT. Different logic values, however, derive for the first and second input of the exclusive-OR element XOR9, as a result whereof the output of the exclusive-OR element XOR9 assumes the logic value of one. As a result thereof, the output AND element UD8 is enabled via the OR element OR3 and enable signal F. The enable signal F, which is generated upon a transition from the highest to the lowest counter reading, is supplied as receiver prompter signal EWL2 from the output AND element UD8.

The receiver prompter signal EWL2 drives the control inputs S of the selection switches MUX5 through MUX8 so respective inputs A may be forwarded to the outputs. At the next cycle of reception clock ET, the new signal status is SZ1 through SZ4 are assumed by the D-flip-flops FF10 through FF13 with new signal status SZ4. With the acceptance of the new signal status SZ4, both inputs of the exclusive-OR element XOR9 again have the same logic value. As a result, the output AND element UD8 is held inactive via the OR element OR3. The receiver prompter signal EWL2 is disconnected and the selection switches MUX5 through MUX8 supply the signals to the respective inputs B.

This condition is maintained as long as no further change of the signal statuses SZ1 through SZ4 occurs.

When the input signal I has the logic value of zero, the message content is dependent upon the input signal R. The input signal R is first accepted by the D-flip-flop FF5 and is subsequently evaluated with the exclusive-OR element XOR5 and the AND elements UD2 and UD3. The AND element UD2 includes negating inputs. The check ensues in parallel, where the exclusive-OR element XOR5 checks the input signal R to determine whether the signal status of the input signal R after the cycle of reception clock ET has changed in comparison to that before the cycle of reception clock ET. In case of a change, the output of the exclusive-OR element XOR5 assumes the logic value of one. The AND element UD2 checks the input signal R to see whether the input signal R has the logic value of zero after and preceding a cycle of reception clock ET. If a value of zero is present, the output of the AND element UD2 assumes the logic value of one. Finally, the AND element UD3 checks the input signal R to determine whether the input signal R has the logic value of one after as well as preceding a cycle of reception clock ET. If a value of one is present, the output of the AND element UD3 assumes the logic value of one.

Dependent upon which signal status of the input signal R is present, one of the D-flip-flops FF6 through FF8, following the afore-mentioned circuit elements, assumes the logical value of one. The AND elements UD4 through UD7 are respectively connected in parallel to the D-flip-flops FF6 through FF8 and D-flip-flop FF9. Each AND elements UD4 through UD7 has a first and a second input respectively connected to the input and to the output of corresponding D-flip-flops FF6 through FF9.

The AND elements UD6 through UD4 each have a negating, third input that is driven with the input signal I. Since the input signal I has the logic value of zero in this situation, the AND elements UD4 through UD6 are activated, while the AND element UD7 is inoperative.

Since the input signal R has one of the afore-mentioned signal statuses at all times, an output of the circuit elements XOR5, UD2 or, respectively, UD3 has the logical value of one at every time.

It is assumed that the output of the AND element UD2 has a logic value of one. It is also assumed that no change in signal status has occurred for a longer period of time. In this case, both the data input D as well as the positive output Q of the D-flip-flop FF7 have a logic value of one, while the data inputs D and the positive outputs Q of the D-flip-flops FF6 and FF8 have a logic value of zero. It is assumed that the signal status SZ2 is present. The output of AND element UD5 has a logic value of one that maintains the reception clock counter unit ZE2 in its counting condition via the OR element OR2.

When the signal status of the input signal R changes from the continuous logic value of one to the continuous logic value of zero, the data input of the D-flip-flop FF7 will have the logic value of zero and the data input of the D-flip-flop FF8 will have the logic value of one. All AND elements UD4 through UD7 are, as a result, inoperative. The reset signal RES assumes the logic value of zero, then the reception clock counter unit ZE2 is reset. At the next cycle of reception clock ET, the positive output Q of the D-flip-flop FF8 assumes the logic value of one, causing the reception clock counter unit ZE2 is enabled via the AND element UD6 and the OR element OR2. Once enabled, the reception clock counter unit ZE2 begins to count.

Since the new signal status SZ3 is now present, the output AND element UD8 is enabled via the exclusive-OR element XOR8 and the OR element OR3. When an overflow of the reception clock counter unit ZE2 occurs, the enable signal F is supplied as receiver prompter signal EWL2. Simultaneously, the selection switches MUX5 through MUX8 are switched, so that the D-flip-flops FF10 through FF13 can assume their respective new signal statuses. As a result, the output AND element UD8 is again inoperative until a new change in signal status ensues. Other possible changes in signal statuses are expected in a similar fashion.

The positive outputs Q of the D-flip-flops FF10 through FF13 are conducted to pins P1 through P4, respectively, at which the signal statuses can be interrogated to determine the appearance of a receiver prompter signal EWL2. The pins P1 through P4 are part of the message information output circuit PORT.

Although modifications and changes may be suggested by those skilled in the art, it is the intention of the inventors to embody within the patent warranted hereon, all changes and modifications as reasonably and properly come within their contribution to the art.

We claim as our invention:

1. A method for controlling a combined first data bit stream and a control bit stream each to be transmitted and a combined second data bit stream and a message bit stream each to be received by a serial interface circuit controlled by a microprocessor, said serial interface circuit having a bit stream converter for a parallel-serial conversion of parallel data generated by said microprocessor and transmitted by said serial interface circuit and for a serial-parallel conversion of said second data bit stream to be received by said serial interface circuit, comprising the steps of:

presetting a first auxiliary circuit for transmitting said first data bit stream and said control bit stream, said first data bit stream either converted by said bit stream converter or generated by said first auxiliary circuit;

transmitting said combined first data bit stream and said control bit stream by said first auxiliary circuit both supplied in accordance with the presetting of said first auxiliary circuit;

generating first prompter signals for said microprocessor in dependence on a transmission clock when transmitting said first data bit stream;

filtering messages out of said combined second data bit stream and said message bit stream by a second auxiliary circuit;

supplying said second data bit stream filtered by said second auxiliary circuit to said bit stream converter;

analyzing said messages for changes in said messages;

generating second prompter signals for said microprocessor when said changes in said messages are still active after a predetermined time period; and retrieving a changed message from a message information output circuit by said microprocessor after indicating said change in said message by said second prompter signal.

2. A method as claimed in claim 1 wherein said first prompter signal is generated when a preset maximum counter reading of a transmission clock counter, counting repeatedly and continuously with a transmission clock, is reached.

3. A method as claimed in claim 1 wherein said second prompter signal is generated when a preset maximum counter reading of a reception clock counter, starting at a change in said message and counting repeatedly and continuously with a reception clock, is reached.

4. A circuit for controlling a first data bit stream and a control bit stream each to be transmitted and a second data bit stream and a message bit stream each to be received by a serial interface circuit controlled by a microprocessor, said serial interface circuit having a bit stream converter for a parallel-serial conversion of parallel data generated by said microprocessor and transmitted by said serial interface circuit and for a serial-parallel conversion of said second data bit stream to be received by said serial interface circuit, comprising:

a first auxiliary means for transmitting said control bit stream and said first data bit stream, said first data bit stream either converted by said bit stream converter or generated by said first auxiliary means in accordance with a presetting state;

a means for presetting said first auxiliary means;

a means for generating first prompter signals for said microprocessor in dependence on a transmission clock when transmitting said first data bit stream;

a second auxiliary means for receiving said second data bit stream and said message bit stream and for filtering messages out of said second data bit stream and said message bit stream;

a means for supplying said second data bit stream filtered by said second auxiliary circuit to said bit stream converter;

a means for analyzing said messages for changes in said messages;

a means for generating second prompter signals for said microprocessor when said changes in said messages are still active after a predetermined time period; and a means for retrieving a changed message by said microprocessor after indicating said change in said message by said second prompter signal.

5. A circuit as claimed in claim 4 wherein said means for generating first prompter signals for said microprocessor has a transmission clock counter counting repeatedly and continuously with a transmission clock and generating a first prompter signal when a preset maximum counter reading of said transmission clock counter is reached.

6. A circuit as claimed in claim 4 wherein said means for generating second prompter signals for said microprocessor has a reception clock counter counting repeatedly and continuously with a reception clock at a change in said message and generating a second prompter signal when a preset maximum counter reading of said reception clock counter is reached.

7. A circuit for controlling a first data bit stream and a control bit stream each to be transmitted and a second data bit stream and a message bit stream each to be received by a serial interface circuit controlled by a microprocessor, said serial interface circuit having a bit stream converter for a parallel-serial conversion of parallel data generated by said microprocessor and transmitted by said serial interface circuit and for a serial-parallel conversion of said second data bit stream to be received by said serial interface circuit, comprising:

a transmission circuit connected with said bit stream converter, comprising an information storage registering circuit for presetting said transmission circuit, said information storage registering circuit is connected with said microprocessor, a transmission clock counter means for counting a transmission clock and a transmission logic section for transmitting said first data bit stream and said control bit stream being dependent on contents of said information storage registering circuit, on a preset maximum counter reading of said transmission clock counter means and on clock signals via a transmission clock line;

said transmission logic section includes outputs for control lines and a data transmission line, and is connected via a transmitter prompter line to said microprocessor;

wherein said transmission clock counter means, having a presettable maximum counter reading, is connected to said transmission clock line;

a reception circuit, connected with said bit stream converter, comprising a message information output circuit connected with said microprocessor, a reception clock counter connected to a reception clock line, and a reception logic circuit; and wherein said reception logic circuit includes inputs for a reception data line and message lines, and is connected via a receiver prompter line to said microprocessor and further connected with said reception clock counter having a presettable maximum counter reading.

8. A circuit as claimed in claim 7, wherein said reception circuit comprises a decoder sub-circuit followed by a timer sub-circuit and a reset sub-circuit; said decoder sub-circuit has a single message line input and a single reception data line input; said reset sub-circuit has an output connected to an inverting reset input of said reception clock counter; said reception clock counter has a time clock output connected to an enable line of said timer sub-circuit; an output of said timer sub-circuit is connected to said receiver prompter line.

9. A circuit as claimed in claim 8, wherein said decoder sub-circuit comprises;
- a first stage comprising a fifth memory element having a data input connected to a reception data line and a clock input connected to said reception clock line;
- a second stage comprising a fifth exclusive-OR element, a second output AND element and a third output AND element;
- a first input of said fifth exclusive-OR element is connected to a first negating input of said second output AND element, said data input of said fifth memory element and to a first input of said third output AND-element; a second input of said fifth exclusive OR-element is connected to a second negating input of said second output AND-element, said non-inverting output of said fifth memory element and to a second input of said third output AND-element;
- a third stage comprises a bank of memory elements including a sixth memory element having a data input connected to an output of said fifth exclusive-OR element; a seventh memory element having a data input connected to an output of said second output AND-element; an eighth memory element having a data input connected to an output of said third output AND-element and a ninth memory element having an input connected to a message line; and
- each memory element in said bank of memory elements has a clock input connected to said reception clock line.

10. A circuit as claimed in claim 9, wherein said memory elements are D Flip-Flops.

11. A circuit as claimed in claim 8, wherein said reset sub-circuit comprises;
- a first stage comprising a bank of output AND-elements including a fourth output AND-element with a first input connected to said output of said fifth exclusive-OR elements and a second input connected to said positive output of said sixth memory element;
- a fifth output AND-element includes a first input connected to said output of said second output AND-element and a second input connected to said non-inverting output of said seventh memory element;
- a sixth output AND-element includes a first input connected to said output of said third output AND-element and a second input connected to said non-inverting output of said eighth memory element;
- a seventh output AND-element includes a first input connected to said message line, an inverting third input of said fourth output AND-element, an inverting third input of said fifth output AND-element and to an inverting third input of said sixth output AND-element; a second input connected to said non-inverting output of said ninth memory element;
- a second stage comprising a second OR-element having inputs connected to each output of said fourth, fifth, sixth and seventh output AND-elements; and
- an output of said second OR-element connected to an inverting reset input of said reception clock counter.

12. A circuit as claimed in claim 11, wherein said memory elements are D Flip-Flops.

13. A circuit as claimed in claim 8, wherein said timer sub-circuit comprises;
- a first stage comprising a bank of four selection switches; a second stage comprising a bank of four memory elements and four output message ports; a third stage comprising a bank of four exclusive-OR-elements; a fourth stage comprising a third OR-element and a fifth stage comprising an eighth output AND-elements;
- wherein each selection switch has a first input connected to a non-inverting output of one of said memory elements in said decoder sub-circuit and to a first input of one of said exclusive-OR elements in said third stage of said timer sub-circuit, a second input connected to a non-inverting output of a memory element in said second stage, a second output of said exclusive OR-element and to an output message port, an output connected to a data input of a memory element; each selection has a control input commonly connected to an output of said eighth output-AND element;
- each memory element has a clock input commonly connected to a single reception clock line;
- each of said exclusive OR-elements has an output connected to an input of said third OR-element;
- said third OR-element has an output connected to a first input of said eighth output-AND element;
- said eighth output AND-element has a second input connected to a time clock output of said reception clock counter, and an output connected to a receiver prompter line; and
- said reception clock counter has a clock input connected to said reception line.

14. A circuit as claimed in claim 13, wherein said memory elements are D Flip-Flops.

15. A circuit as claimed in claim 8, wherein said reception circuit has a programmable reception clock counter; whereby overflow from said counter forms said time clock outputs.

16. A circuit as claimed in claim 7 wherein each of said message lines in said reception logic circuit is connected with a corresponding storage unit each comprising a selection switch and a memory element followed by an exclusive OR-element;
- each said selection switch has a control input, a first data input and a second data input; wherein each said first data input is connected to a corresponding one of said message lines and to one of the inputs of said exclusive OR-element and a not inverting output of said memory element is connected to said second data input of said selection switch; and
- an output of said exclusive ORelement is connected to a separate input of a first OR-element; an output of said first OR-element is connected to an inverting reset input of said reception clock counter and to a first input of a first output AND element; a time clock output of said reception clock counter is connected to a second input of said first output AND element; an output of said first output AND element is connected to each of said control inputs of said selection switches and to said receiver prompter line; each of said memory elements have clock inputs which are connected to a reception clock line.